US012157445B2

(12) United States Patent
Jung

(10) Patent No.: US 12,157,445 B2
(45) Date of Patent: Dec. 3, 2024

(54) ACTUATOR FOR ELECTRONIC PARKING BRAKE

(71) Applicant: HL MANDO CORPORATION, Gyeonggi-do (KR)

(72) Inventor: Daejune Jung, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 383 days.

(21) Appl. No.: 17/628,219

(22) PCT Filed: Jul. 15, 2020

(86) PCT No.: PCT/KR2020/009283
§ 371 (c)(1),
(2) Date: Jan. 19, 2022

(87) PCT Pub. No.: WO2021/015480
PCT Pub. Date: Jan. 28, 2021

(65) Prior Publication Data
US 2022/0355778 A1 Nov. 10, 2022

(30) Foreign Application Priority Data
Jul. 23, 2019 (KR) .......................... 10-2019-0089007

(51) Int. Cl.
*F16D 65/16* (2006.01)
*B60T 13/74* (2006.01)
(Continued)

(52) U.S. Cl.
CPC .............. *B60T 13/74* (2013.01); *F16D 65/16* (2013.01); *H02K 5/04* (2013.01); *F16D 2121/24* (2013.01)

(58) Field of Classification Search
CPC ...... B60T 13/74; F16D 65/16; F16D 2121/24; H02K 5/04
See application file for complete search history.

(56) References Cited

U.S. PATENT DOCUMENTS 8,552,605 B2 * 10/2013 Sahara ................ H02K 5/1732
310/91
9,410,590 B2 * 8/2016 Jang ...................... H02K 7/116
(Continued)

FOREIGN PATENT DOCUMENTS

KR 10-1999-0033849 5/1999
KR 10-1321719 10/2013
(Continued)

OTHER PUBLICATIONS

International Search Report for PCT/KR2020/009283 mailed on Oct. 27, 2020 (now published as WO 2021/015480) with English translation provided by WIPO.
(Continued)

*Primary Examiner* — Thomas W Irvin
(74) *Attorney, Agent, or Firm* — Womble Bond Dickinson (US) LLP

(57) ABSTRACT

The present disclosure relates to an actuator for an electronic parking brake and, more particularly, to an actuator for an electronic parking brake, whereby a motor may be stably fixed using a simple structure. To this end, an actuator for an electronic parking brake according to the present disclosure comprises: a motor having a bracket to fix a position of a motor housing; a main housing in which the motor is accommodated; and a main cover seated on an upper end of the main housing, wherein a first fastening protrusion extending downward to be inserted into a first fastening groove formed in the motor housing and a second fastening protrusion extending outward in the radial direction to be inserted into a second fastening groove formed in the main housing are formed on the bracket, and when the motor is assembled, the second fastening groove supports the second fastening protrusion to prevent the axial direction movement of the second fastening protrusion.

8 Claims, 5 Drawing Sheets

(51) Int. Cl.
*H02K 5/04* (2006.01)
*F16D 121/24* (2012.01)

(56) References Cited

U.S. PATENT DOCUMENTS

| | | | | |
|---|---|---|---|---|
| 9,616,862 | B2* | 4/2017 | Qi | B60T 13/741 |
| 10,960,866 | B2* | 3/2021 | Jang | F16D 55/226 |
| 11,355,993 | B2* | 6/2022 | Ortiz | B60N 2/02246 |
| 11,554,767 | B2* | 1/2023 | Jang | F16H 57/03 |
| 11,787,379 | B2* | 10/2023 | Ko | F16D 51/24 |
| | | | | 188/325 |
| 11,923,745 | B2* | 3/2024 | Kim | H02K 15/14 |
| 2011/0187215 | A1* | 8/2011 | Sahara | H02K 5/1732 |
| | | | | 310/90 |
| 2015/0075923 | A1* | 3/2015 | Jang | F16D 65/14 |
| | | | | 188/162 |
| 2017/0023081 | A1* | 1/2017 | Sala | F16D 65/18 |
| 2018/0058526 | A1 | 3/2018 | Lee et al. | |
| 2018/0283507 | A1* | 10/2018 | Lee | F16H 37/041 |
| 2020/0083775 | A1* | 3/2020 | Ortiz | H02K 5/22 |
| 2021/0394734 | A1* | 12/2021 | Ko | F16D 51/22 |
| 2022/0017057 | A1* | 1/2022 | Lee | H02K 7/1166 |
| 2022/0021265 | A1* | 1/2022 | Kim | H02K 15/14 |
| 2023/0375058 | A1* | 11/2023 | Jung | F16D 65/14 |

FOREIGN PATENT DOCUMENTS

| | | |
|---|---|---|
| KR | 10-1561263 | 10/2015 |
| KR | 10-1600928 | 3/2016 |
| KR | 10-2019-0047174 | 5/2019 |

OTHER PUBLICATIONS

Written Opinion of the International Searching Authority for PCT/KR2020/009283 mailed on Oct. 27, 2020 (now published as WO 2021/015480) with English translation provided by Google Translate.

* cited by examiner

ACTUATOR FOR ELECTRONIC PARKING BRAKE

CROSS-REFERENCE TO RELATED APPLICATIONS

This application is the national stage of International Patent Application No. PCT/KR2020/009283 filed on Jul. 15, 2020, which claims priority to and the benefit of Korean Patent Application No. 10-2019-0089007, filed on Jul. 23, 2019, the disclosures of which are incorporated herein by reference in their entireties.

TECHNICAL FIELD

The present disclosure relates to an actuator for an electronic parking brake and, more particularly, to an actuator for an electronic parking brake, whereby a motor may be stably fixed using a simple structure.

BACKGROUND

An actuator for an electronic parking brake of a general vehicle includes a motor and a power transmission device for operating a friction pad installed on a caliper of a brake system during parking.

When the driver presses the parking brake switch, the rotational force of the actuator's motor is transmitted to the input shaft of the caliper through the power transmission device. The rotation of the input shaft advances the pressure connection sleeve, and the advancement of the pressure connection sleeve moves the piston and the caliper housing accommodating it to approach each other, so that the two friction pads mounted on the piston and caliper housing press against both sides of the disc to prevent rotation.

Such motor and power transmission device are accommodated in the main housing, and in particular, the motor needs to be stably fixed so that the rotation shaft does not incline.

It is because it the rotation shaft of the motor is tilted, misalignment occurs between the motor and the power transmission device, which may cause noise during use.

In the conventional case, a plurality of screws are used to fix such a motor to the main housing, but since it is necessary to use a separate tool to fix the screws, there is another problem in that the assembly cost and assembly time increase due to the increase in the number of parts, so it is difficult to apply.

Therefore, there is a need for improvement.

The above information disclosed in this Background section is only for enhancement of understanding of the background of the disclosure and it may therefore contain information that does not form the prior art that is already known to a person of ordinary skill in the art.
(Patent Document 1) Korean Laid-Open Patent Publication No. 10-2019-0047174 (published 2019 May 8)

SUMMARY

Technical Problem

The technical problem to be solved by the present disclosure is to provide an actuator for an electronic parking brake, whereby a motor may be stably fixed using a simple structure.

Technical Solution

The actuator for an electronic parking brake according to an embodiment of the present disclosure comprises: a motor having a bracket to fix a position of a motor housing; a main housing in which the motor is accommodated; and a main cover seated on an upper end of the main housing, wherein a first fastening protrusion extending downward to be inserted into a first fastening groove formed in the motor housing and a second fastening protrusion extending outward in the radial direction to be inserted into a second fastening groove formed in the main housing are formed on the bracket, and when the motor is assembled, the second fastening groove supports the second fastening protrusion to prevent the axial direction movement of the second fastening protrusion.

In this case, the second fastening groove may include a first wide part extending along the axial direction, and a second guide part extending along the circumferential direction from the first guide part.

In addition, a support bar extending upward to check the degree of rotation of the bracket when assembling the motor may be formed on the bracket.

In addition, a support frame on which the support bar is seated when the motor is assembled may be formed in the main housing.

In this case, a seating surface may be formed on the support frame to support an outer circumferential surface of the support bar.

Alternatively, a third fastening protrusion extending downward toward the bracket may be formed on the main cover, and a third fastening groove into which the third fastening protrusion is inserted may be formed in the support bar.

In this case, the third fastening protrusion may be formed at a position where the support bar can be inserted into the third fastening groove in a state where it is seated on the support frame.

Advantageous Effects

Since the actuator for an electronic parking brake of the present disclosure having the above configuration uses the first and second fastening protrusions formed on the bracket to fix the motor to the main housing, but is supported to prevent the axial direction movement of the second fastening protrusion, it is possible to stably fix the motor, thereby effectively preventing noise from occurring.

In addition, since the motor is fixed in such a way that the second fastening protrusion is inserted into the second fastening groove, the operator can assemble the motor without a separate tool when assembling it, thereby capable of reducing assembly time and reducing assembly cost.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

DETAILED DESCRIPTION OF THE EMBODIMENTS

Figure 1:
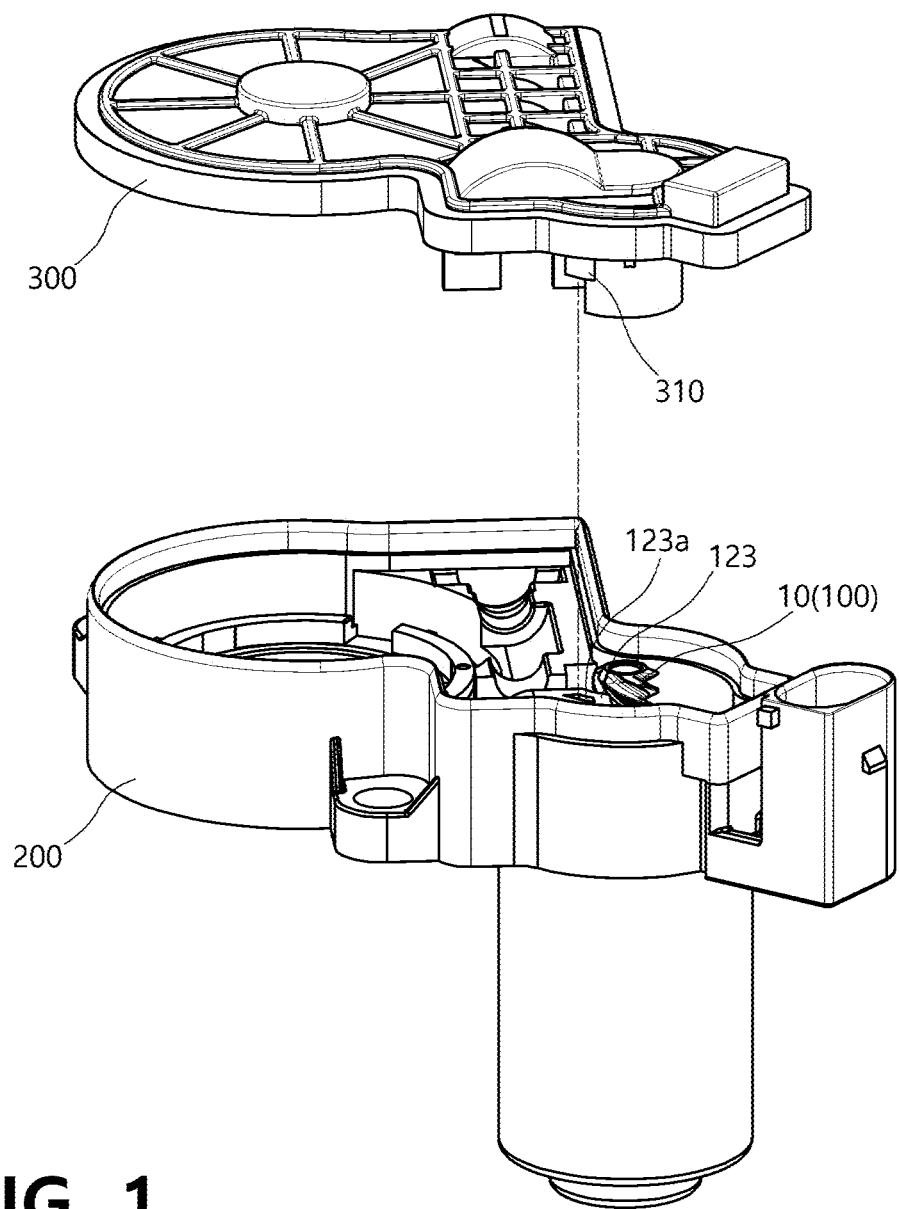
FIG. 1 is an exploded perspective view of a main housing and a main cover according to an exemplary embodiment of the present disclosure.

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity. Throughout the specification, like reference numerals denote like elements.

It is understood that the terms "comprise" or "have" when used in this specification, are intended to specify the presence of stated features, integers, steps, operations, members, components and/or a combination thereof but not preclude the possibility of the presence or addition of one or more other features, integers, steps, operations, members, components, or a combination thereof. In addition, it will be understood that when an element such as a layer, film, region, or substrate is referred to as being "on" another element, it can be "directly on" the other element or intervening elements may also be present. Conversely, it will be understood that when an element such as a layer, film, region, or substrate is referred to as being "below" another element, it can be "directly below" the other element or intervening elements may also be present.

Figure 2:
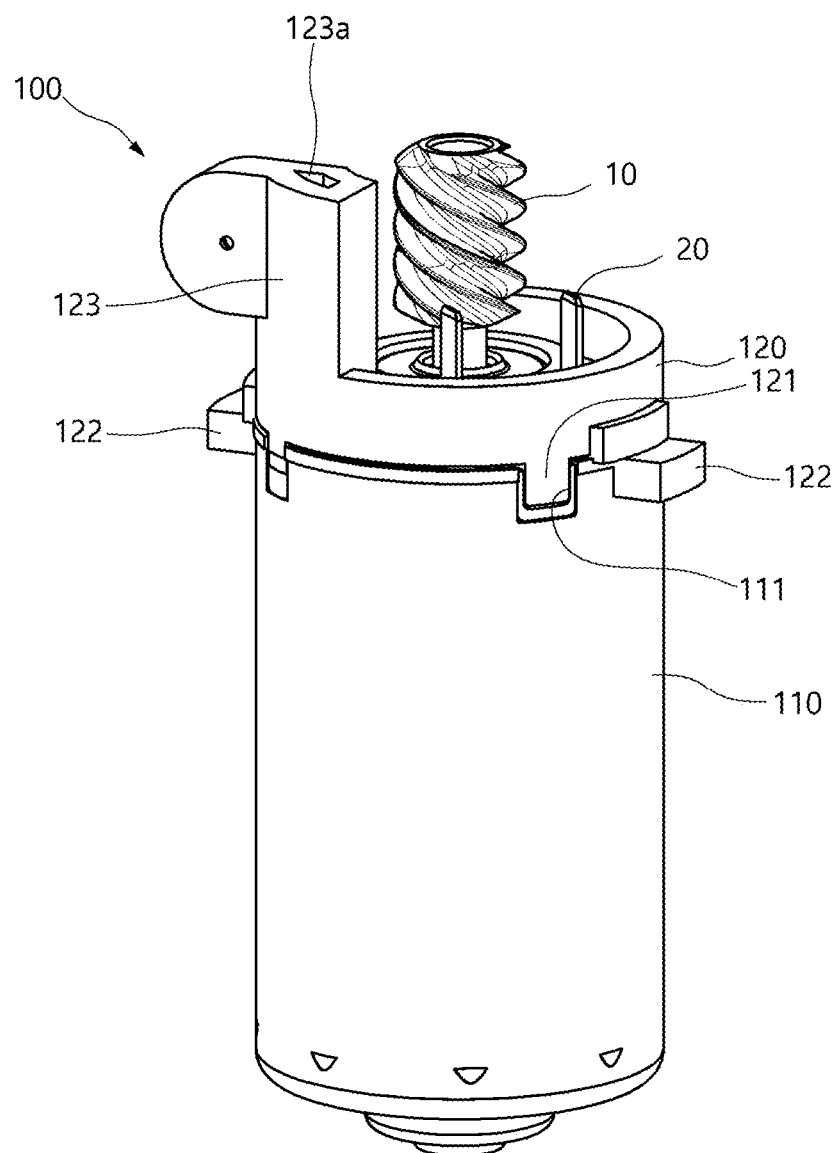
FIG. 2 is a perspective view of a motor according to an exemplary embodiment of the present disclosure.
Figure 3:
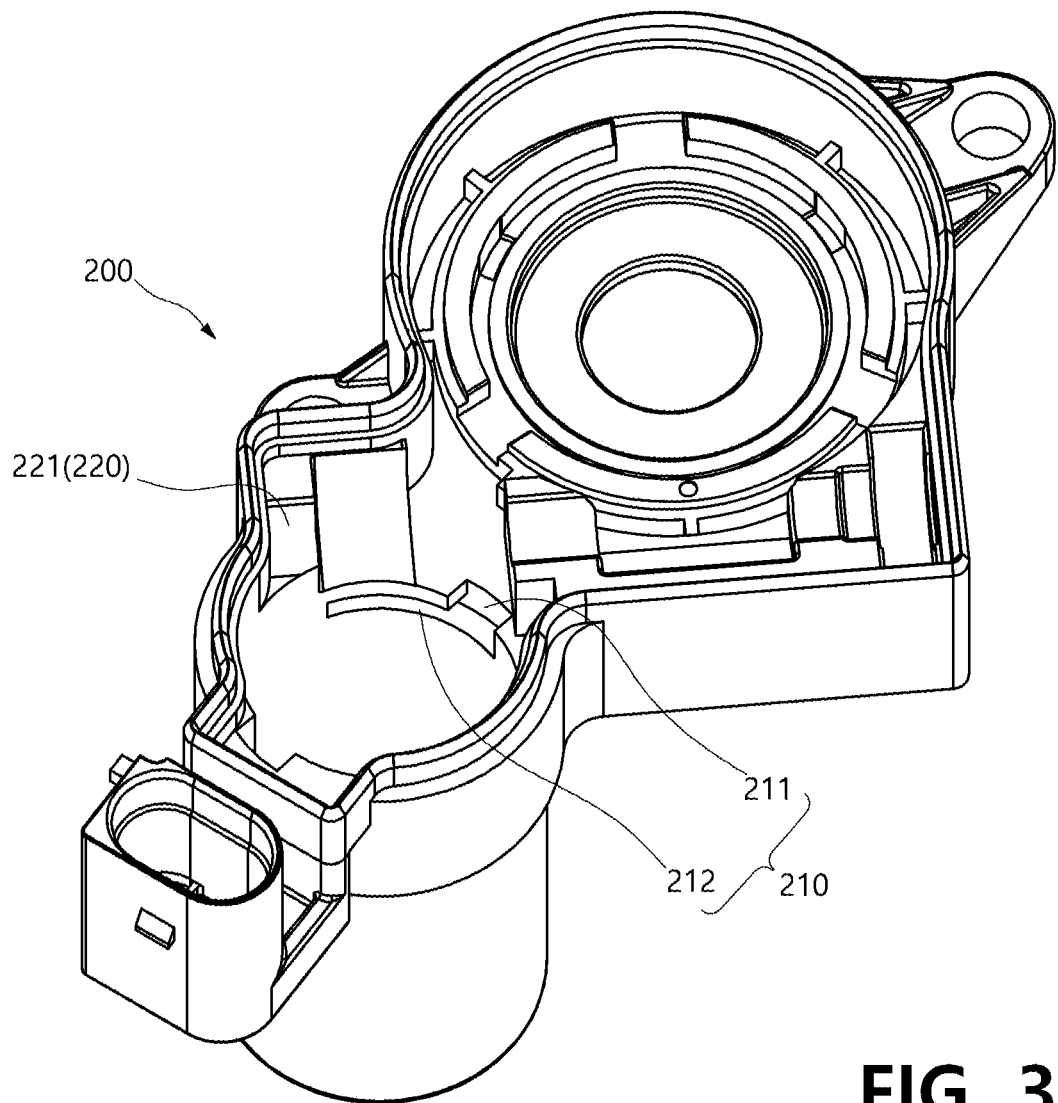
FIG. 3 is a perspective view of a main housing according to an exemplary embodiment of the present disclosure.
Figure 4:
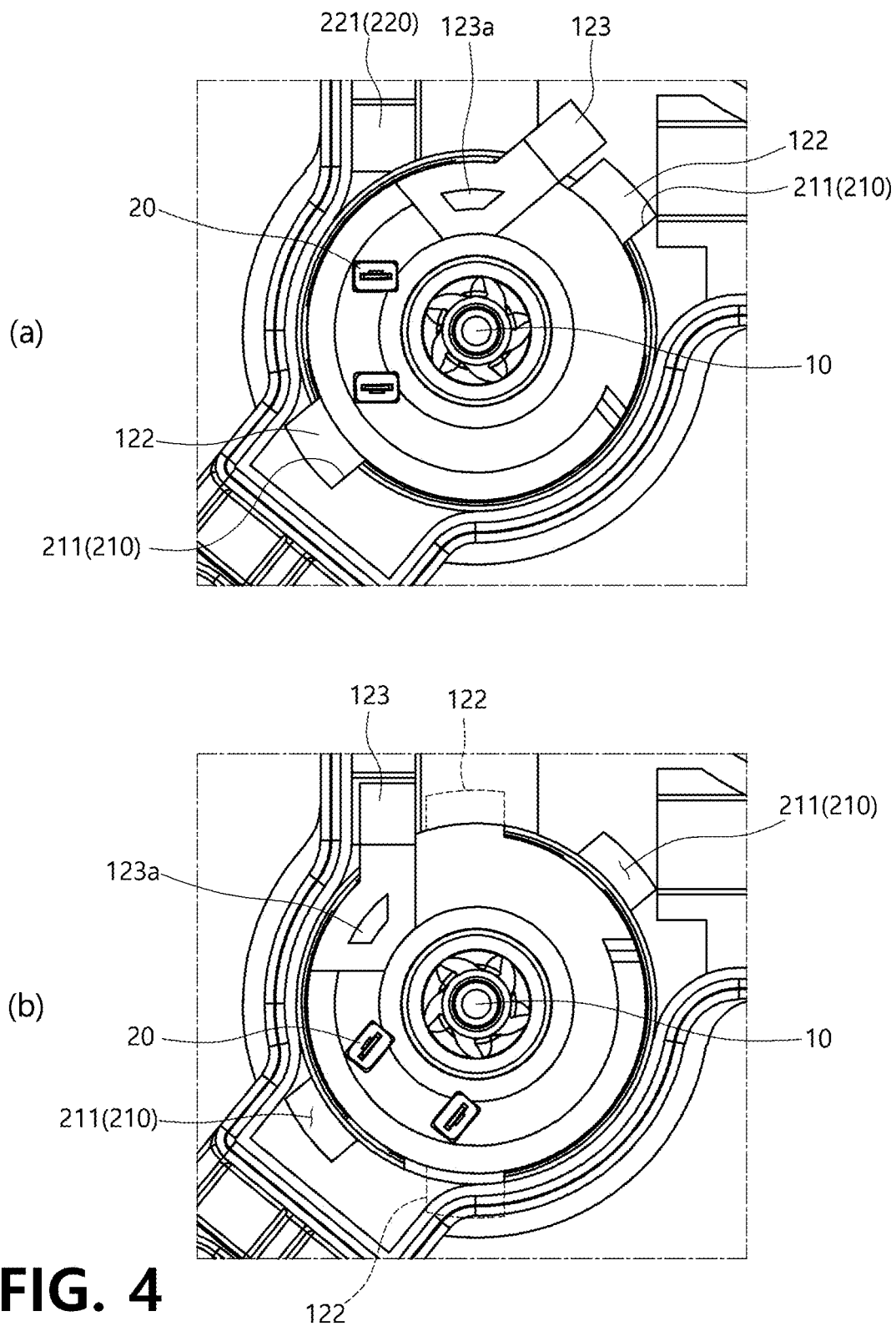
FIG. 4 is a view showing a process of assembling a motor to a main housing according to an exemplary embodiment of the present disclosure, in which (a) is a view showing a state in which a second fastening protrusion is inserted into a first guide part of a second fastening groove, and (b) is a view showing a state in which a second fastening protrusion is inserted into a second guide part of a second fastening groove.
Figure 5:
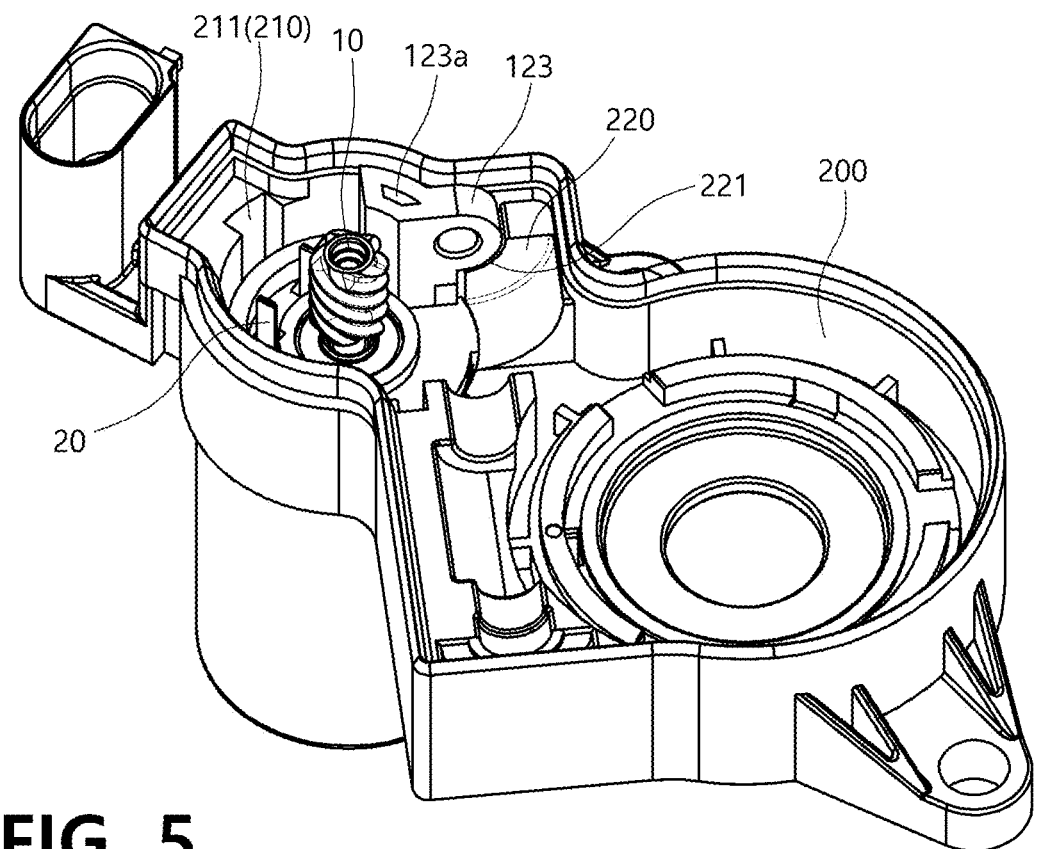
FIG. 5 is a perspective view showing a state in which a motor is assembled to a main housing, according to an exemplary embodiment of the present disclosure.

FIG. 1 is an exploded perspective view of a main housing and a main cover according to an exemplary embodiment of the present disclosure; FIG. 2 is a perspective view of a motor according to an exemplary embodiment of the present disclosure; FIG. 3 is a perspective view of a main housing according to an exemplary embodiment of the present disclosure; FIG. 4 is a view showing a process of assembling a motor to a main housing according to an exemplary embodiment of the present disclosure, in which (a) is a view showing a state in which a second fastening protrusion is inserted into a first guide part of a second fastening groove, and (b) is a view showing a state in which a second fastening protrusion is inserted into a second guide part of a second fastening groove; and, FIG. 5 is a perspective view showing a state in which a motor is assembled to a main housing, according to an exemplary embodiment of the present disclosure.

As shown in FIG. 1, an actuator for an electronic parking brake according to an exemplary embodiment of the present disclosure includes a motor 100 having a bracket 120 to fix a position of a motor housing 110; a main housing 200 in which the motor 100 is accommodated; and a main cover 300 seated on an upper end of the main housing 200.

In this case, the motor 100 assembled to the main housing 200 provides a driving force so that two friction pads mounted on a caliper housing press both sides of the disk during parking, and in this process, it is necessary to be stably fixed so that the assembly state of the motor 100 does not change.

If the motor 100 is not stably fixed, there may be a problem that a rotation shaft 10 of the motor 100 is tilted, the motor housing 110 moves in the axial direction, or the motor housing 110 rotates in the circumferential direction, and in this case, as described above, this may cause noise during use.

Accordingly, in order to stably fix the motor 100 in the main housing 200, as shown in FIG. 2, a first fastening protrusion 121 extending downward to be inserted into a first fastening groove 111 formed in the motor housing 110 and a second fastening protrusion 122 extending outward in the radial direction to be inserted into a second fastening groove 210 formed in the main housing 200 are formed at the bracket 120. That is, the first fastening groove 111 is formed in the motor housing 110 in which a rotor and a stator are accommodated, and the bracket 120 is assembled on the upper part of the motor housing 110, and in this assembly process, the first fastening protrusion 121 formed on the bracket 120 is assembled to be inserted into the first fastening groove 111 of the motor housing 110 to firmly fix the bracket 120 and the motor housing 110. Meanwhile, at least two first fastening protrusions 121 may be formed along the circumference of the bracket 120, and to correspond to this, at least two first fastening grooves 111 may be also formed along the circumference of the motor housing 110. In this case, each of the first fastening protrusions 121 may be formed to have different downward extending lengths, and to correspond to this, each of the first fastening grooves 111 may also be formed to have different insertion depths. Alternatively, it is also possible to form different angles between the adjacent first fastening protrusions 121, and to form different angles between the adjacent first fastening grooves 111 to correspond thereto. That is, for example, when two first fastening protrusions 121 are formed along the circumference of the bracket 120, the angle between the first fastening protrusions 121 may be about 60°. With this configuration, when assembling the bracket 120 to the motor housing 110, it is possible to prevent erroneous assembly of the bracket 120.

Thereafter, the motor 100 provided with the bracket 120 will be assembled to the main housing 200, and as described above, the motor 100 will be assembled so that the second fastening protrusions 122 extending outward in the radial direction of the bracket 120 are inserted into the second fastening grooves 210 formed in the main housing 200.

When the motor 100 is assembled in this way, the second fastening grooves 210 support the second fastening protrusions 122 not to move in the axial direction, so that in the course of use, the rotation shaft 10 of the motor 100 is not tilted or the motor housing 110 is stably fixed without moving in the axial direction, thereby effectively preventing noise from occurring in the course of use.

In addition, since the motor 100 is fixed in such a way that the second fastening protrusion 122 is inserted into the second fastening groove 210, the operator can assemble the motor 100 simply without a separate tool when assembling it, thereby capable of reducing assembly time and reducing assembly cost.

The above-described bracket 120 is formed so that the rotation shaft 10 of the motor 100 and an electrode terminal 20 for supplying power can pass through.

In this case, as shown in FIG. 3, the second fastening groove 210 may include a first guide part 211 extending along the axial direction, and a second guide part 212 extending along the circumferential direction from the first guide part 211.

That is, as shown in FIG. 4(a), when assembling the motor 100, the bracket 120 is moved in the axial direction so that the second fastening protrusion 122 formed on the bracket 120 moves in the axial direction along the first guide part 211, in this way, as shown in FIG. 4(b) in a state in which the bracket 120 is moved in the axial direction, assembly may be simply accomplished by rotating the bracket 120 so that the second fastening protrusion 122 moves in the circumferential direction along the second guide part 212.

When the second fastening protrusion 122 formed on the bracket 120 is disposed on the second guide part 212 as described above, the axial direction movement of the second fastening protrusion 122 is limited, so that the motor 100 can be stably fixed. Meanwhile, at least two second fastening protrusions 122 may be formed along the circumference of the bracket 120, and to correspond to this, at least two second fastening grooves 210 may also be formed along the circumference of the part where the motor 100 is assembled in the main housing 200. In this case, each of the second fastening protrusions 122 may be formed to have different lengths extending outward in the radial direction, and to correspond to this, each of the second fastening grooves 210 may also be formed to have different lengths extending outward in the radial direction. Alternatively, it is also possible to form different angles between the adjacent second fastening protrusions 122, and to form different angles between the adjacent second fastening grooves 210 to correspond thereto. That is, for example, when two second fastening protrusions 122 are formed along the circumference of the bracket 120, the angle between the second fastening protrusions 122 may be about 60°. With this configuration, when assembling the motor 100 to the main housing 200, it is possible to prevent erroneous assembly of the motor 100.

As shown in FIG. 5, a support bar 123 extending upward to check the degree of rotation of the bracket 120 when assembling the motor 100 may be formed on the bracket 120.

As described above, when assembling the motor 100, the second fastening protrusion 122 moves in the axial direction along the first guide part 211 formed in the second fastening groove 210 and then moves in the circumferential direction along the second guide part 212, and as such, since the second fastening protrusion 122 moves along the second guide part 212 formed inside the main housing 200, the operator cannot visually check the position of the second fastening protrusion 122 directly.

Therefore, the support bar 123 extending upward is formed on the bracket 120, and the operator can visually check the degree of rotation of the bracket 120 through the support bar 123, so that the motor 100 can be accurately assembled.

Alternatively, it is also possible to form a separate confirmation member (not shown) on the inner circumferential surface of the second guide part 212. Such a confirmation member may be formed in a protruding shape, and if the second fastening protrusion 122 is configured to be caught by the confirmation member when the second fastening protrusion 122 is positioned at a correct position in the process of moving in the circumferential direction along the second guide part 212, the operator can accurately assemble the motor 100 through the feeling that the second fastening protrusion 122 is caught by the confirmation member as described above.

In addition, even when an external force is applied so that the second fastening protrusion 122 moves in the opposite direction to the assembly direction of the motor 100, since the second fastening protrusion 122 is caught by the confirmation member, the assembly state of the motor 100 can be stably maintained by preventing any movement of the second fastening protrusion 122.

In addition, as shown in FIG. 5, a support frame 220 on which the support bar 123 is seated when the motor 100 is assembled may be formed in the main housing 200.

As described above, the support bar 123 extending upward is formed on the bracket 120, and the operator can visually check the degree of rotation of the bracket 120 through the support bar 123, and the operator can accurately assemble the motor 100 by simply allowing the support bar 123 to be seated on the support frame 220 formed in the main housing 200, thereby reducing the effort and labor of the operator when assembling the motor 100.

In this case, a seating surface 221 may be formed on the support frame 220 to support the outer circumferential surface of the support bar 123.

That is, the seating surface 221 is formed in a shape corresponding to the shape of the outer circumferential surface of the support bar 123 as shown in FIG. 5, and after assembling the motor 100, the operator can visually check the assembly state of the outer circumferential surface and the seating surface 221 of the support bar 123 to directly determine whether the rotation shaft 10 of the motor 100 is disposed in the correct position without being tilted.

As shown in FIG. 1, a third fastening protrusion 310 extending downward toward the bracket 120 may be formed on the main cover 300, and a third fastening groove 123a into which the third fastening protrusion 310 is inserted may be formed in the support bar 123.

That is, when assembling the actuator, the main cover 300 is seated on the upper end of the main housing 200. So, if the third fastening protrusion 310 is formed on the main cover 300 and the third fastening groove 123a is formed in the support bar 123, when the main cover 300 is seated, the third fastening protrusion 310 is inserted into the third fastening groove 123a to effectively prevent the support bar 123 from being arbitrarily separated from the support frame 220 as the motor 100 rotates in the course of use.

To this end, the third fastening protrusion 310 may be formed at a position where the support bar 123 can be inserted into the third fastening groove 123a in a state where it is seated on the support frame 220.

Although exemplary embodiments of the present disclosure have been described, the spirit of the present disclosure is not limited to the embodiments set forth herein. Those of ordinary skill in the art who understand the spirit of the present disclosure may easily propose other embodiments through supplement, change, removal, addition, etc. of elements within the same spirit, but the embodiments will be also within the scope of the present disclosure.

What is claimed is:

1. An actuator for an electronic parking brake comprising: a motor having a bracket to fix a position of a motor housing; a main housing in which the motor is accommodated; and a main cover seated on an upper end of the main housing, wherein a first fastening protrusion extending downward to be inserted into a first fastening groove formed in the motor housing and a second fastening protrusion extending outward in the radial direction to be inserted into a second fastening groove, which has a first guide groove part extending along the axial direction and a second guide groove part extending from the first guide groove part along the circumferential direction and is formed in the main housing, are formed on the bracket, and the second fastening groove supports the second fastening protrusion to prevent the axial direction movement of the second fastening protrusion.

2. The actuator for the electronic parking brake of claim 1, wherein the second fastening groove comprises a first guide part extending along the axial direction, and a second guide part extending along the circumferential direction from the first guide part.

3. The actuator for the electronic parking brake of claim 1, wherein a support bar extending upward to check the degree of rotation of the bracket is formed on the bracket.

4. The actuator for the electronic parking brake of claim 3, wherein a support frame on which the support bar is seated is formed in the main housing.

5. The actuator for the electronic parking brake of claim 4, wherein a seating surface is formed on the support frame to support an outer circumferential surface of the support bar.

6. The actuator for the electronic parking brake of claim 4, wherein a third fastening protrusion extending downward toward the bracket is formed on the main cover, and a third fastening groove into which the third fastening protrusion is inserted is formed in the support bar.

7. The actuator for the electronic parking brake of claim 6, wherein the third fastening protrusion is formed at a position where the support bar can be inserted into the third fastening groove in a state where it is seated on the support frame.

8. The actuator for the electronic parking brake of claim 1, further comprising another first fastening protrusion having a different length or shape from the first fastening protrusion and extending downward to be inserted into another first fastening groove formed in the motor housing.

* * * * *